(12) United States Patent
Kim et al.

(10) Patent No.: US 10,250,366 B2
(45) Date of Patent: Apr. 2, 2019

(54) METHOD FOR TRANSMITTING AND RECEIVING REFERENCE SIGNAL IN WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Hyunsoo Ko, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 40 days.

(21) Appl. No.: 15/513,710

(22) PCT Filed: Sep. 24, 2015

(86) PCT No.: PCT/KR2015/010128
§ 371 (c)(1),
(2) Date: Mar. 23, 2017

(87) PCT Pub. No.: WO2016/048074
PCT Pub. Date: Mar. 31, 2016

(65) Prior Publication Data
US 2017/0288835 A1    Oct. 5, 2017

Related U.S. Application Data

(60) Provisional application No. 62/054,959, filed on Sep. 24, 2014.

(51) Int. Cl.
*H04B 7/00* (2006.01)
*H04L 5/00* (2006.01)
(Continued)

(52) U.S. Cl.
CPC .......... *H04L 5/0048* (2013.01); *H04L 5/0051* (2013.01); *H04L 27/2613* (2013.01);
(Continued)

(58) Field of Classification Search
CPC . H04W 24/02; H04W 24/04; H04W 56/0005; H04W 72/1273
(Continued)

(56) References Cited

U.S. PATENT DOCUMENTS

| | | | | |
|---|---|---|---|---|
| 8,787,245 B2* | 7/2014 | Seo | ........................ | H04B 7/155 370/315 |
| 8,923,250 B2* | 12/2014 | Noh | ...................... | H04L 5/0016 370/230 |
| 9,019,924 B2* | 4/2015 | Ng | ...................... | H04W 72/042 370/329 |
| 9,048,914 B2* | 6/2015 | Kishiyama | ........... | H04B 7/0678 |

(Continued)

FOREIGN PATENT DOCUMENTS

WO   WO 2011/102683 A2   8/2011
WO   WO 2013/046023 A1   4/2013
(Continued)

OTHER PUBLICATIONS

3GPP TSG-RAN WG1 #59bis Ericsson, R1-100050, Jan. 2010, pp. 1-5.*

*Primary Examiner* — Dmitry Levitan
(74) *Attorney, Agent, or Firm* — Birch, Stewart, Kolasch & Birch, LLP

(57) ABSTRACT

A method for transmitting, by a base station, a demodulation reference signal (DMRS) in a wireless communication system according to one embodiment of the present invention comprises the steps of generating a DMRS sequence; mapping the DMRS sequence to resource elements of respective layers; and transmitting, through respective antenna ports corresponding to the respective layers, the DMRS sequence mapped to the resource elements, wherein if the number of layers exceeds a predetermined number, the DMRS (Continued)

sequence is mapped to the resource elements according to a pattern on at least two bundled consecutive resource blocks.

9 Claims, 21 Drawing Sheets

(51) Int. Cl.
*H04W 72/04* (2009.01)
*H04L 27/26* (2006.01)

(52) U.S. Cl.
CPC ......... *H04W 72/042* (2013.01); *H04L 5/0016* (2013.01); *H04L 5/0023* (2013.01)

(58) Field of Classification Search
USPC ........ 370/310, 312, 328, 329, 343, 345, 349
See application file for complete search history.

(56) References Cited

U.S. PATENT DOCUMENTS

| | | | |
|---|---|---|---|
| 9,246,538 B2* | 1/2016 | Seo | H04L 5/0023 |
| 9,769,812 B2* | 9/2017 | Chae | H04W 72/042 |
| 9,800,385 B2* | 10/2017 | Wang | H04L 5/0048 |
| 2013/0064216 A1* | 3/2013 | Gao | H04W 72/04 |
| | | | 370/330 |
| 2015/0318973 A1* | 11/2015 | Wang | H04L 5/0023 |
| | | | 370/329 |
| 2017/0078006 A1* | 3/2017 | Liu | H04B 7/0456 |
| 2017/0288835 A1* | 10/2017 | Kim | H04W 72/042 |

FOREIGN PATENT DOCUMENTS

| | | |
|---|---|---|
| WO | WO 2014/038865 A1 | 3/2014 |
| WO | WO 2014/098523 A1 | 6/2014 |
| WO | WO 2014/133341 A1 | 9/2014 |

\* cited by examiner ( a ) Control-Plane Protocol Stack ( b ) User-Plane Protocol Stack

▨ : DMRS GROUP 1

▨ : DMRS GROUP 2

(a) legacy antenna system (b) active antenna system (AAS)

METHOD FOR TRANSMITTING AND RECEIVING REFERENCE SIGNAL IN WIRELESS COMMUNICATION SYSTEM AND APPARATUS THEREFOR

CROSS REFERENCE TO RELATED APPLICATIONS

This application is the National Phase of PCT International Application No. PCT/KR2015/010128, filed on Sep. 24, 2015, which claims priority under 35 U.S.C. 119(e) to U.S. Provisional Application. No. 62/054,959, filed on Sep. 24, 2014, all of which are hereby expressly incorporated by reference into the present application.

TECHNICAL FIELD

The present invention relates to a wireless communication system, and more particularly, to a method for transmitting and receiving a reference signal between a user equipment (UE) and a base station (eNB) in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Based on the aforementioned discussion, an object of the present invention is to provide a method for transmitting and receiving a reference signal for supporting multiple layers in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

To achieve the object of the present invention, according to one aspect of the present invention, a method for transmitting, by an eNB, a demodulation reference signal (DMRS) in a wireless communication system comprises generating a sequence of the DMRS; mapping the sequence of the DMRS into resource elements of each of layers; and transmitting the sequence of the DMRS mapped into the resource elements through each of antenna ports corresponding to the each of layers, wherein if a number of the layers exceeds a predetermined number, the sequence of the DMRS is mapped into the resource elements in accordance with a pattern on at least two bundled consecutive resource blocks.

To achieve the object of the present invention, according to another aspect of the present invention, an eNB for transmitting a demodulation reference signal (DMRS) in a wireless communication system comprises a processor for generating a sequence of the DMRS and mapping the sequence of the DMRS into resource elements of each of layers; and a transmitter for transmitting the sequence of the DMRS mapped into the resource elements through each of antenna ports corresponding to the each of the layers, wherein the processor maps the sequence of the DMRS into the resource elements in accordance with a pattern on at least two bundled consecutive resource blocks if the number of layers exceeds a predetermined number.

To achieve the object of the present invention, according to other aspect of the present invention, a method for receiving, by a UE, a demodulation reference signal (DMRS) in a wireless communication system comprises receiving a sequence of the DMRS mapped into resource elements of each of layers through each of antenna ports corresponding to the each of the layers; and decoding a PDSCH (physical downlink shared channel) on the basis of the sequence of the DMRS, wherein if the number of layers exceeds a predetermined number, the sequence of the DMRS is mapped into the resource elements in accordance with a pattern on at least two bundled consecutive resource blocks.

Preferably, the sequence of the DMRS is generated at a length of $12N_{RB}^{max,DL}$ if the number of layers is the predetermined number or less, and the sequence of the DMRS is generated at a length of $12N_{RB}^{max,DL}/2$ if the number of layers exceeds the predetermined number, wherein $N_{RB}^{max,DL}$ denotes a maximum value of a downlink bandwidth configuration.

Preferably, the eNB may puncture the sequence of the DMRS at a length of ½ if the number of layers exceeds the predetermined number.

Preferably, the pattern on at least two bundled consecutive resource blocks may be a pattern that reduces density of the resource elements, into which the sequence of the DMRS is mapped, to ½ in a frequency domain.

Preferably, the layers may be sequentially allocated to the antenna ports in accordance with indexes of the antenna ports if the number of the layers is the predetermined number or less, and the layers may be alternately allocated to at least two groups of the antenna ports if the number of the layers exceeds the predetermined number.

More preferably, a second group of the antenna ports among the groups of the antenna ports may be used for transmission of the DMRS only if the number of the layers exceeds the predetermined number.

More preferably, first resource elements and second resource elements are mutually exclusive, the DMRS sequence transmitted through a first group of antenna ports among the groups of the antenna ports being mapped into the first resource elements, and the DMRS sequence transmitted through a second group of antenna ports among the groups of the antenna ports is mapped into the second resource elements.

More preferably, the eNB applies orthogonal codes corresponding to the each of antenna ports to the sequence of the DMRS, wherein the orthogonal codes may be reused per each of the groups of the antenna ports if the number of layers exceeds the predetermined number.

According to the embodiment of the present invention, a UE and an eNB can efficiently transmit and receive a DMRS for multiple layers of 8 layers or more. Since a DMRS structure designed for transmission of maximum 8 layers is reused, maximum 16 multiple streams can be demodulated while a change of a current mobile communication system is minimized.

It will be appreciated by persons skilled in the art that that the effects that could be achieved with the present invention are not limited to what has been particularly described hereinabove and other advantages of the present invention will be more clearly understood from the following detailed description.

DETAILED DESCRIPTION OF THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
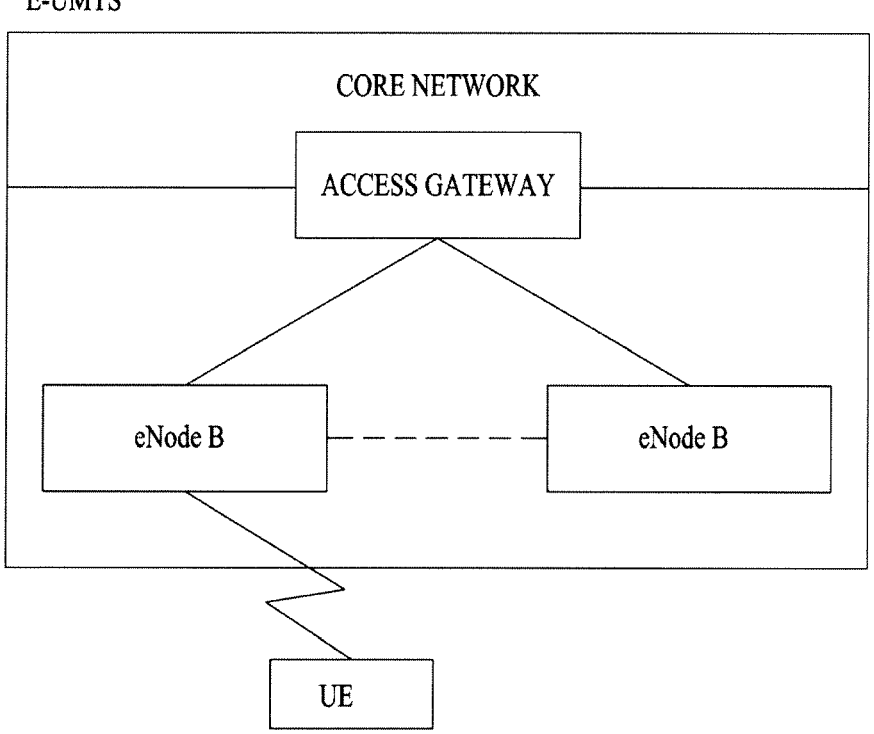
FIG. 1 is a diagram schematically illustrating a network structure of an E-UMTS as an exemplary radio communication system.
Figure 2:
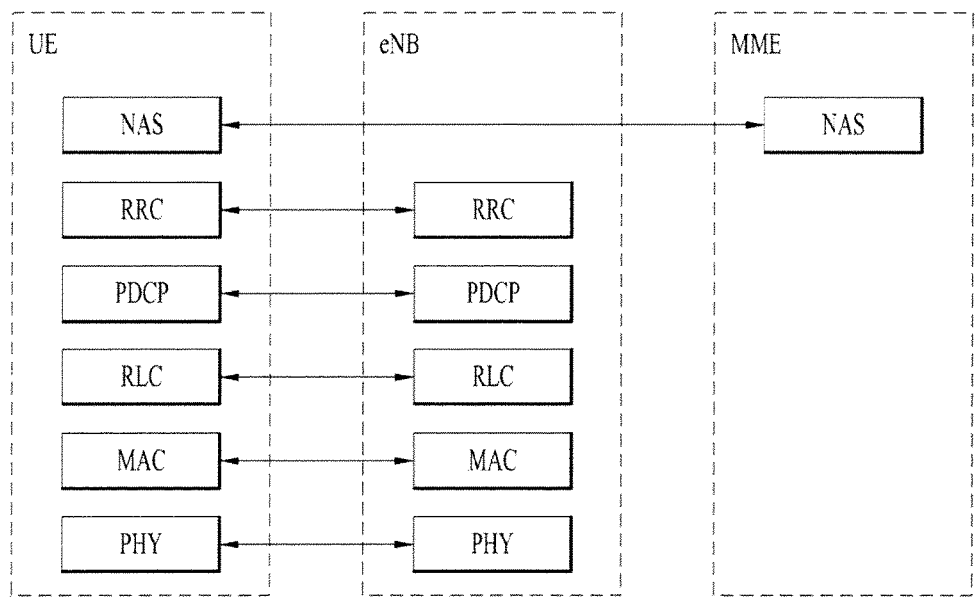
FIG. 2 is a diagram illustrating structures of a control plane and a user plane of a radio interface protocol between a UE and an E-UTRAN based on the 3GPP radio access network specification.
Figure 2:
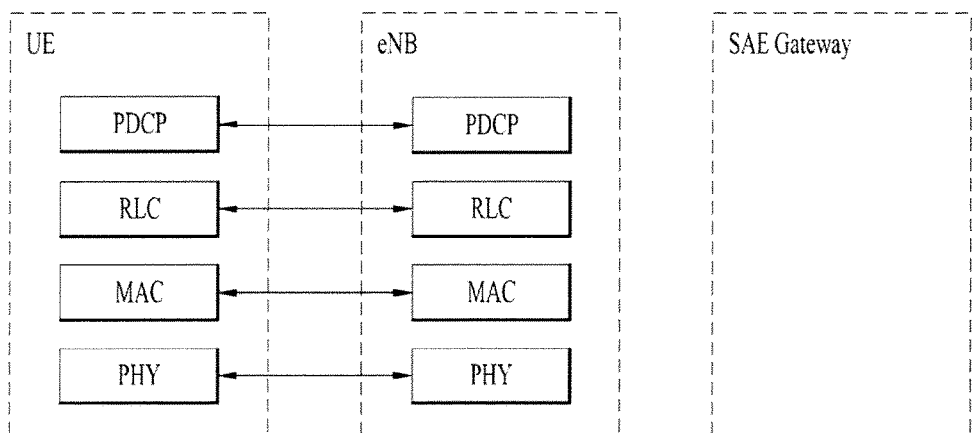

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
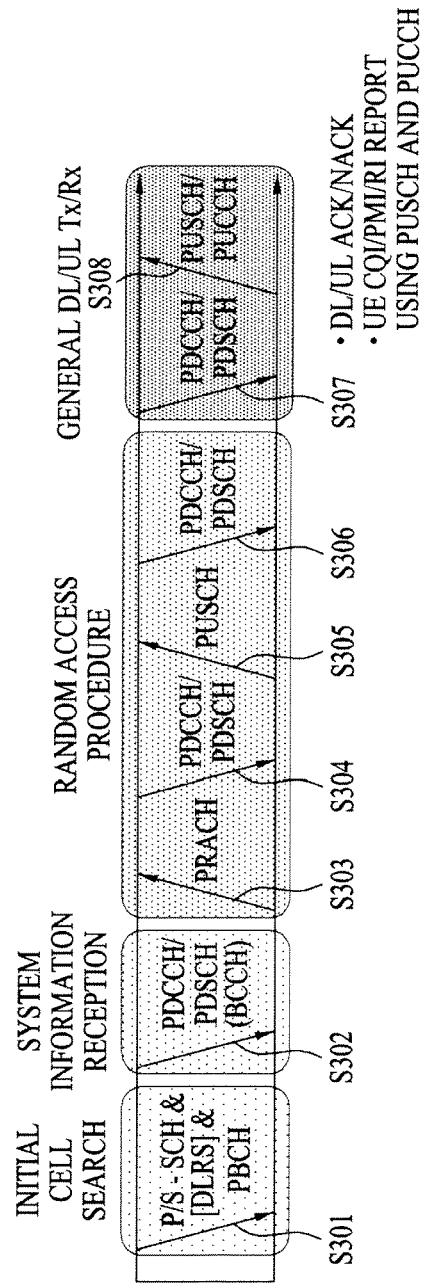
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
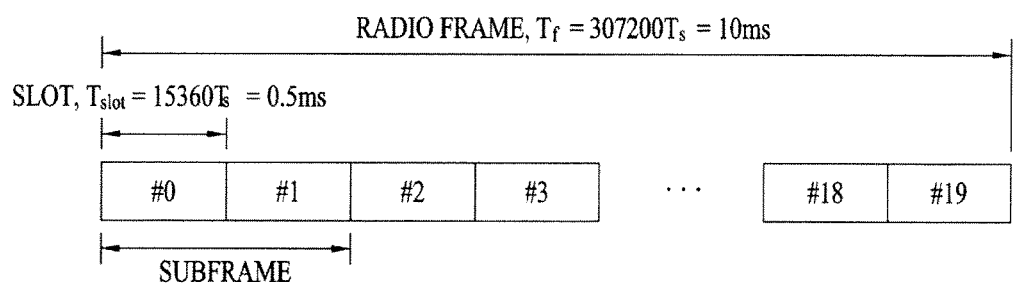
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360 T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
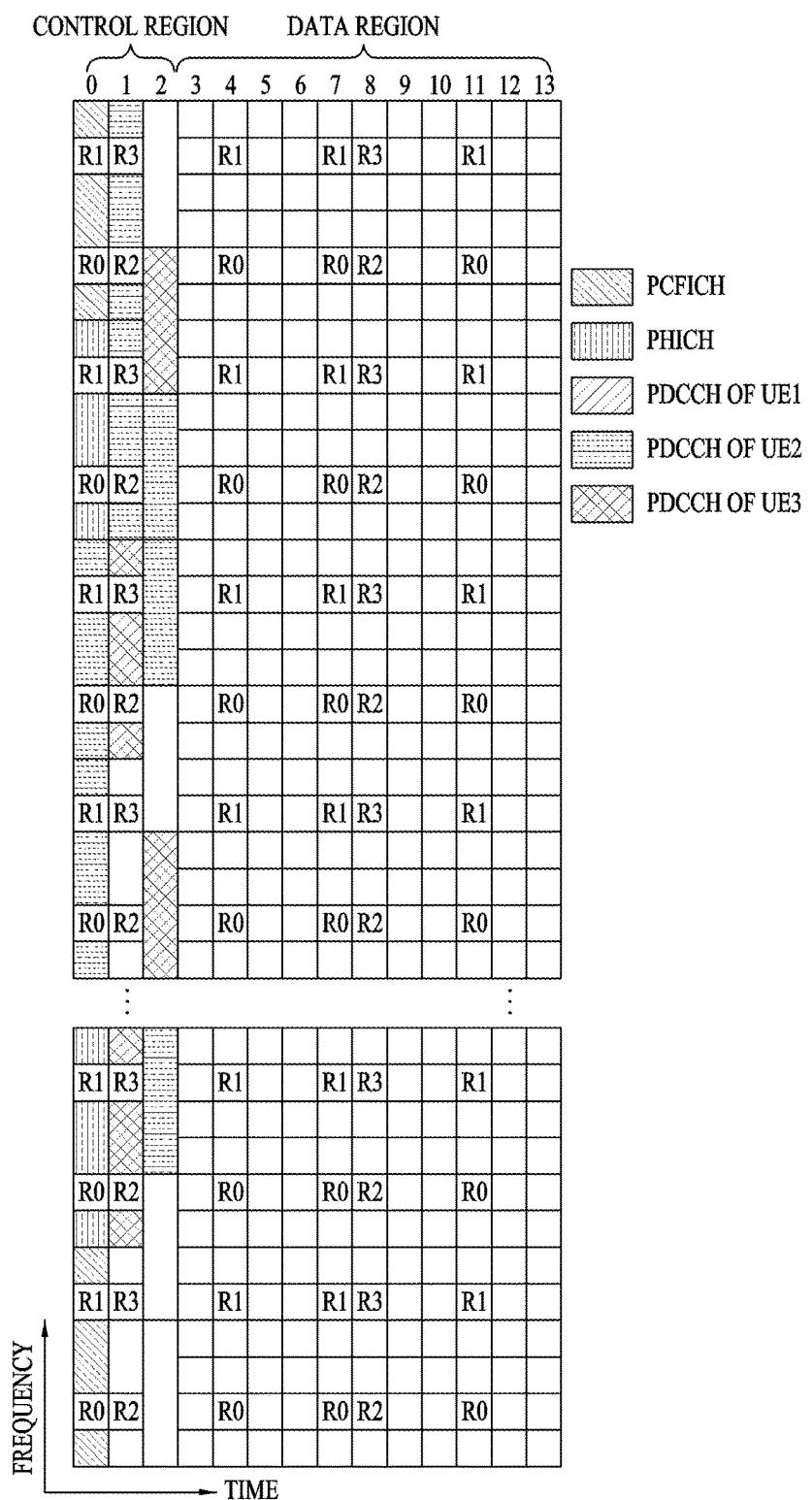
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
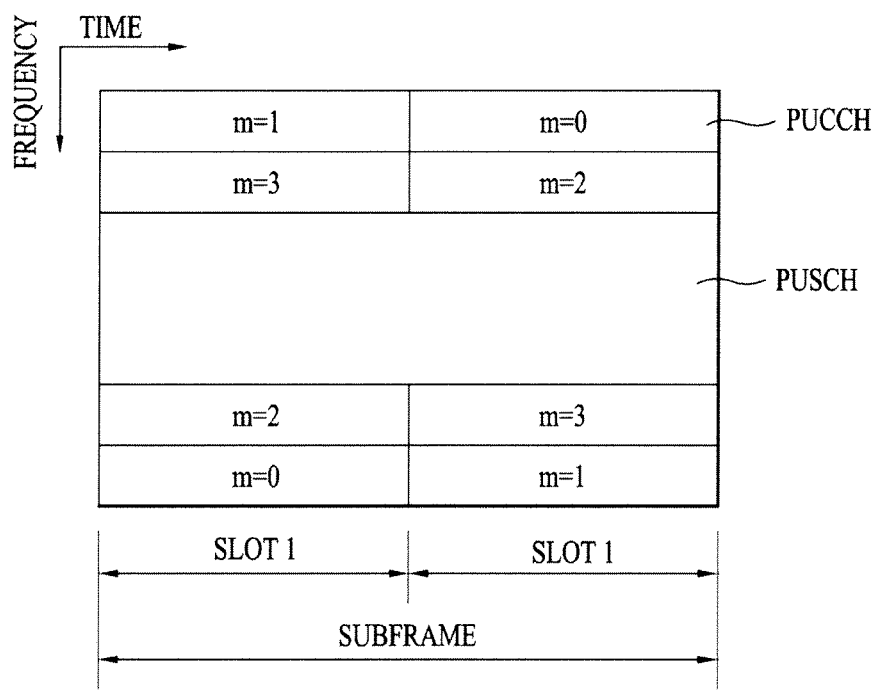
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
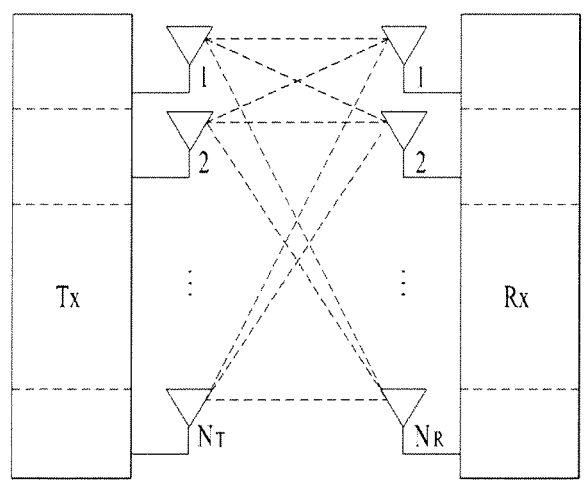
FIG. 7 is a diagram illustrating a configuration of a general MIMO communication system.

FIG. 7 illustrates the configuration of a typical MIMO communication system.

A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \qquad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s=[s_1,s_2,\ldots,s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ 0 & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e., the maximum number of different pieces of transmittable information. Thus, the channel matrix H may be expressed by the following Equation 7.

$$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multi-point (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)). In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Now, a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
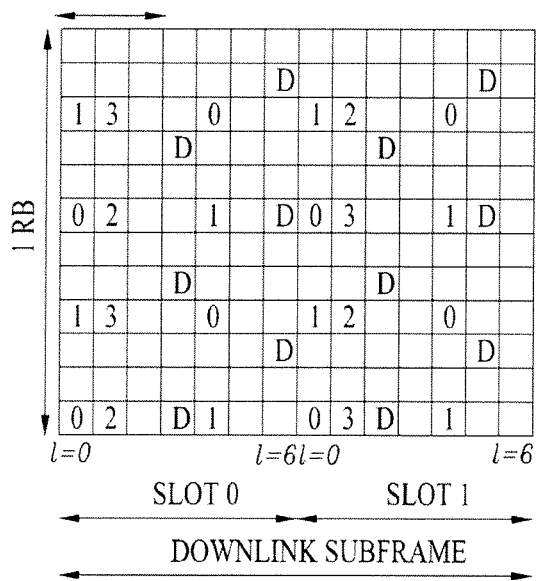
FIG. 8 and FIG. 9 are diagrams of a structure of a reference signal in LTE system supportive of downlink transmission using 4 antennas.
Figure 9:
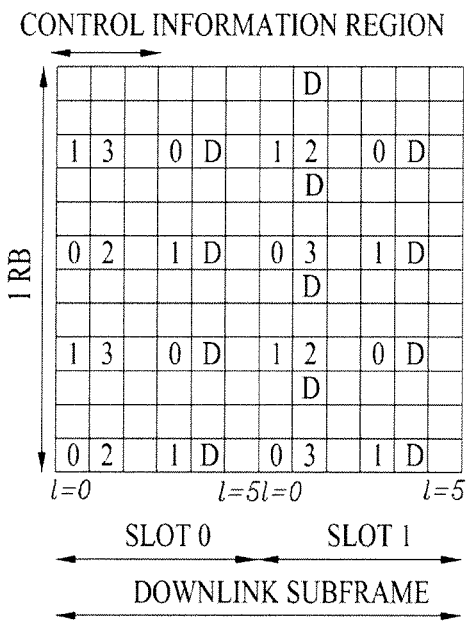

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
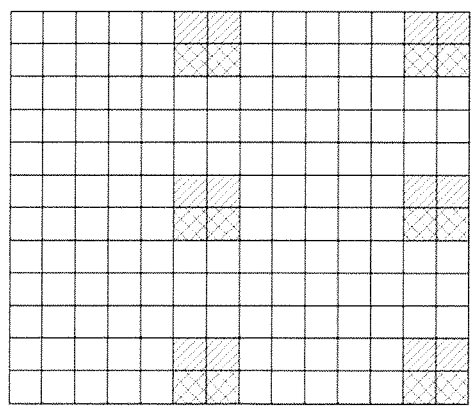
FIG. 10 is a diagram for an example of assigning a downlink DM-RS defined by a current 3GPP standard document.

FIG. 10 illustrates an exemplary DL DMRS allocation defined in a current 3GPP standard specification.

Referring to FIG. 10, DMRSs for antenna ports 7, 8, 11, and 13 are mapped using sequences for the each of antenna ports in a first DMRS group (DMRS Group 1), whereas DMRSs for antenna ports {9, 10, 12, and 14} are mapped using sequences for the each of antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| CSI reference signal configuration | Number of CSI reference signals configured | | | | | |
|---|---|---|---|---|---|---|
| | 1 or 2 | | 4 | | 8 | |
| | (k', l') | $n_s \bmod 2$ | (k', l') | $n_s \bmod 2$ | (k', l') | $n_s \bmod 2$ |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| CSI reference signal configuration | Number of CSI reference signals configured | | | | | |
|---|---|---|---|---|---|---|
| | 1 or 2 | | 4 | | 8 | |
| | (k', l') | $n_s \bmod 2$ | (k', l') | $n_s \bmod 2$ | (k', l') | $n_s \bmod 2$ |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Figure 11:
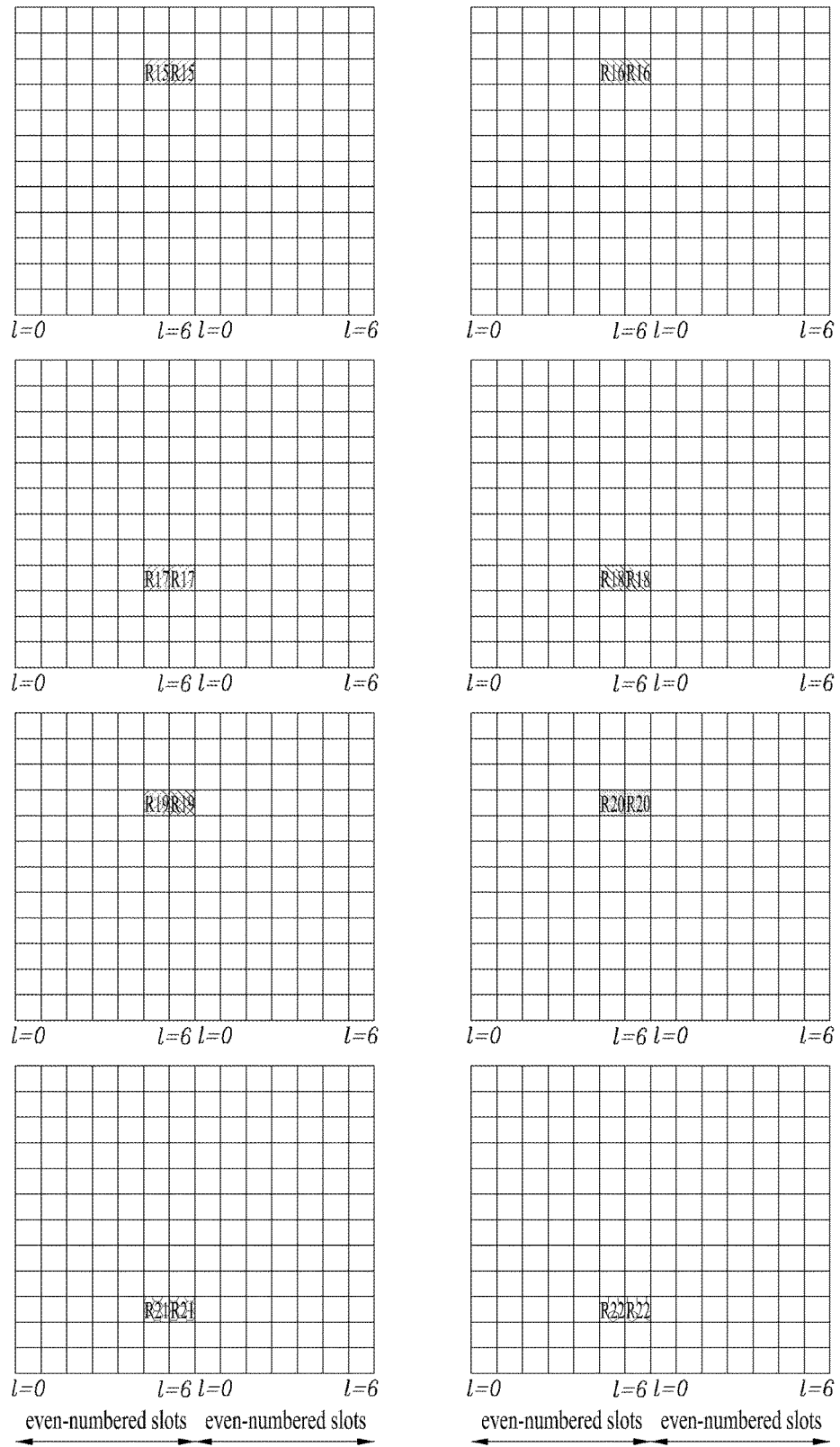
FIG. 11 is a diagram for an example of a CSI-RS configuration #0 in case of a normal CP among downlink CSI-RS configurations defined by a current 3GPP standard document.

In [Table 1] and [Table 2], (k',l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$ [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. A normal CSI-RS not the ZP CSI-RS will be referred to as a NZP (Non zero-power) CSI-RS.

Active Antenna System (AAS)

Figure 12:
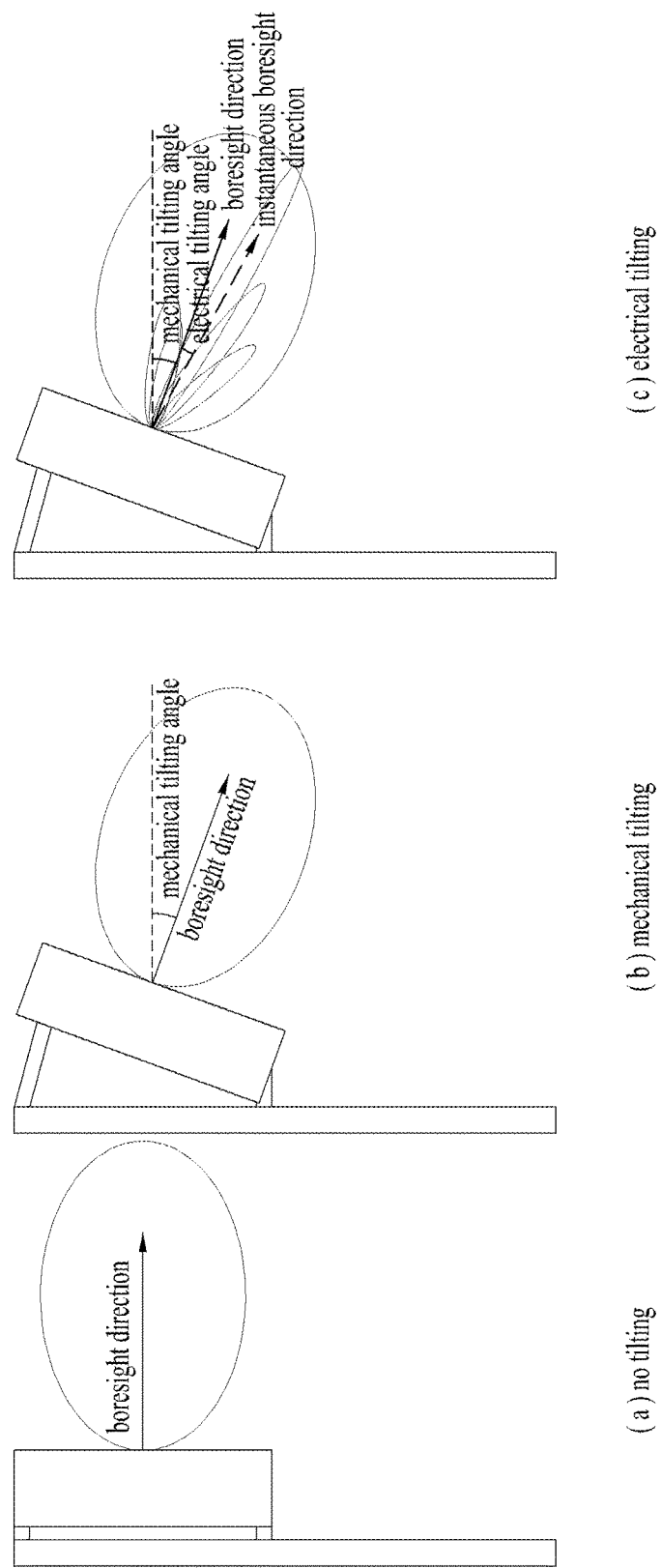
FIG. 12 is a diagram illustrating a wireless communication environment according to one embodiment of the present invention.

FIG. 12 is a diagram illustrating an antenna tilting scheme.

In a legacy mobile communication system, an eNB reduces inter-cell interference (ICI) and increases SINR of UEs within a cell by using mechanical tilting shown in FIG. 12(b) or electrical tilting shown in FIG. 12(c). However, a problem occurs in that mechanical tilting causes a beam direction to be fixed at initial antenna installation. A problem also occurs in that electrical tilting allows only very restrictive vertical beamforming due to cell-fixed tilting, despite the advantage of changing a tilting angle through an internal phase shift module.

Figure 13:
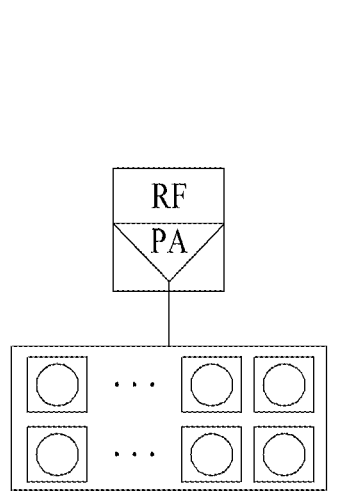
FIG. 13 is a diagram illustrating CSI-RSs according to one embodiment of the present invention.
Figure 13:
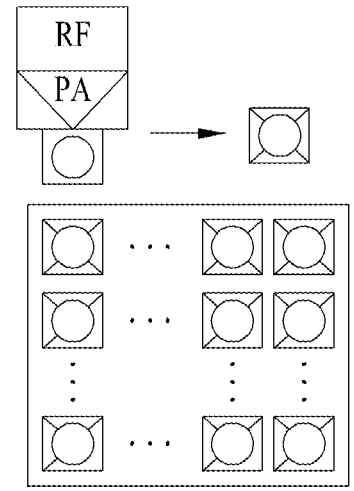

FIG. 13 is a diagram illustrating an active antenna system. Referring to FIG. 13, as compared to the conventional antenna system of FIG. 13(a), the AAS of FIG. 13(b) includes a plurality of antenna modules, each of which includes a radio frequency (RF) module such as a power amplifier (PA), that is, an active device so that the AAS can control the power and phase of each antenna module.

3D Beamforming

Generally, a linear array antenna, i.e. a one-dimensional array antenna, such as a ULA (uniform linear array) has been considered as a MIMO antenna structure. In this one-dimensional array structure, beams that may be formed by beamforming exist on a two-dimensional (2D) plane. The same applies to a passive antenna system (PAS) based MIMO structure of an eNB. Although a PAS based eNB has vertical antennas and horizontal antennas, the vertical antennas cannot configure beamforming in a vertical direction and may allow only the above-described mechanical tilting because the vertical antennas are in one RF module.

However, as the antenna structure of the eNB has evolved into an AAS, RF modules are independently configured even in vertical antennas. Consequently, vertical beamforming as well as horizontal beamforming becomes possible. This is called elevation beamforming or vertical beamforming. The vertical beamforming may also be referred to as three-dimensional (3D) beamforming in that beams that can be generated according to the vertical beamforming may be formed in a 3D space in the vertical and horizontal directions. That is, the evolution of a one-dimensional array antenna structure to a 2D array antenna structure enables 3D beamforming. 3D beamforming is not necessarily formed when an antenna array is planar. Rather, 3D beamforming may be configured even in a 3D array structure such as a conformal (ring) array.

A feature of 3D beamforming lies in that MIMO processing is implemented on a 3D space in view of various antenna layouts other than existing linear antenna array. Even though a UE moves forward or backward from an eNB as well as to the left and right of the eNB, beamforming may be configured due to 3D beamforming, whereby a higher degree of freedom is given to UE-specific beamforming.

As transmission environments using an AAS based 2D array antenna structure, not only an outdoor-to-outdoor environment where an outdoor eNB transmits a signal to an outdoor UE but also an outdoor-to-indoor (O2I) environment where an outdoor eNB transmits a signal to an indoor UE and an indoor hotspot where an indoor eNB transmits a signal to an indoor UE may be considered.

An eNB needs to consider vertical beam steering based on various UE heights in relation to building heights as well as UE-specific horizontal beam steering in a real cell environment in which a plurality of buildings is present in a cell. Considering this cell environment, significantly different channel characteristics from those of an existing wireless channel environment, for example, shadowing/pathloss changes according to different heights, fading characteristic variations, etc. need to be reflected. To this end, studies of a 3D channel model are ongoing as the current 3GPP LTE Rel-12 standardization item.

For example, a DMRS allocation pattern of CDM (Code Divisional Multiplexing) based RS multiplexing is used like the related art. However, a method suggested in the present invention reduces DMRS density per RB based on RB bundling, and obtains a DMRS port for estimating added layers.

Hereinafter, for convenience of description, additional DMRS port indexes will be described as, but not limited to, #15 to #22 (additional 8 layers) in addition to the legacy port indexes #7 to #14 (8 layers). Since the DMRS ports #15 to #22 are repeated with the legacy CSI-RS port indexes #15 to #22, the ports may be configured as DMRS ports #23 to #30.

DMRS Pattern for Layer Transmission Exceeding 8

A DMRS pattern design method for demodulation of maximum 16 multiple layers while maintaining the legacy maximum DMRS RE density will be suggested. For example, the legacy method for using DMRS is changed by bundling of basic resource allocation RBs. For example, RBs allocated continuously as shown in FIG. 14 are subjected to bundling in a unit of 2 RBs, and RS density of a single port is reduced to ½.

RS density of a time domain is maintained as 4 REs per TTI. For example, the DMRS is transmitted through 4 REs for a time length (TTI) of 2 slots at a specific subcarrier for transmitting the DMRS.

On the other hand, RS density of a frequency domain is reduced from 6 REs per 2 RBs to 3 REs per 2 RBs. For example, the DMRS is mapped into 4 REs for a frequency interval of 2 RBs at a specific OFDMA symbol for transmitting the DMRS.

Figure 14:
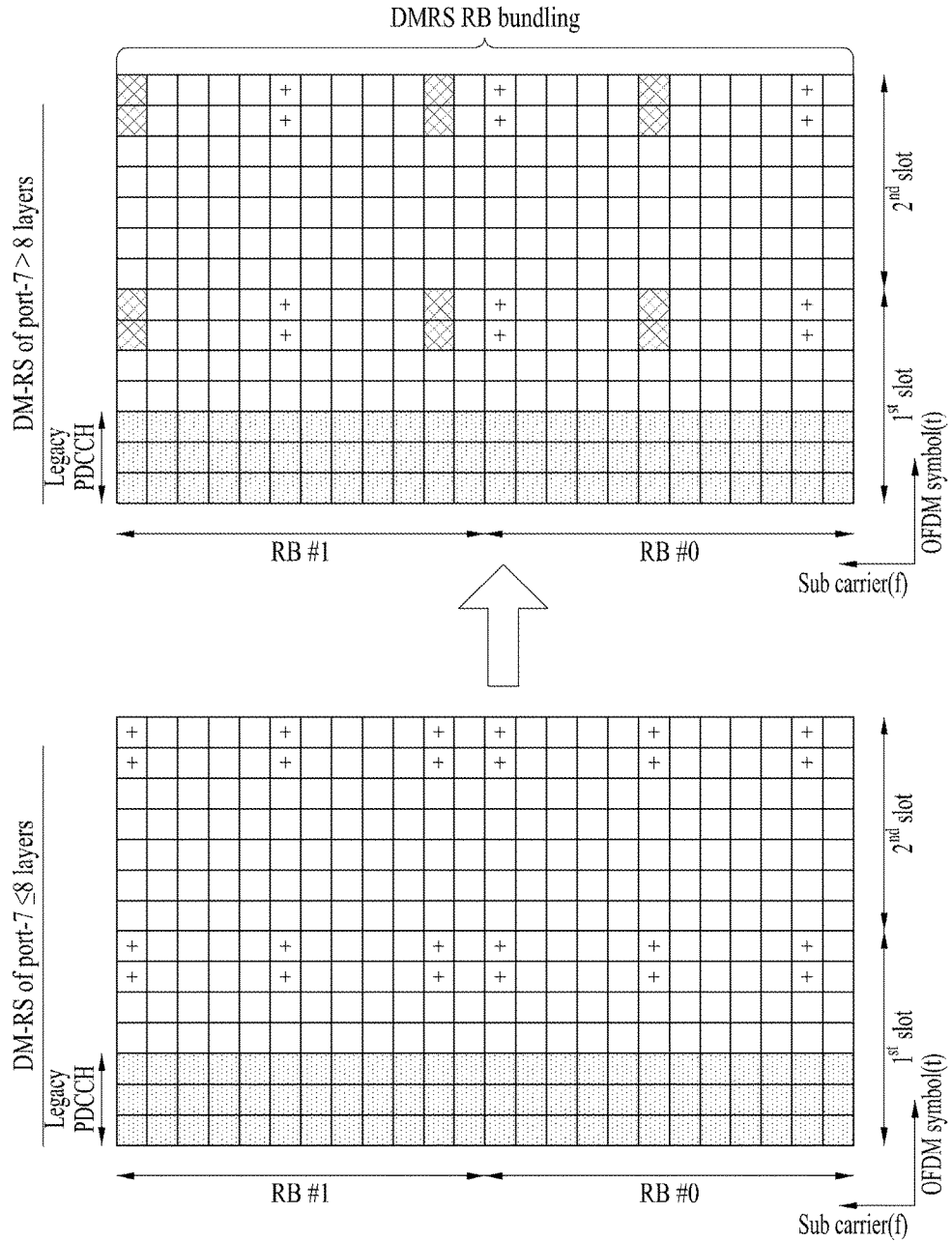
FIG. 14 is a diagram illustrating FB-CSI-RS configuration.
Figure 15:
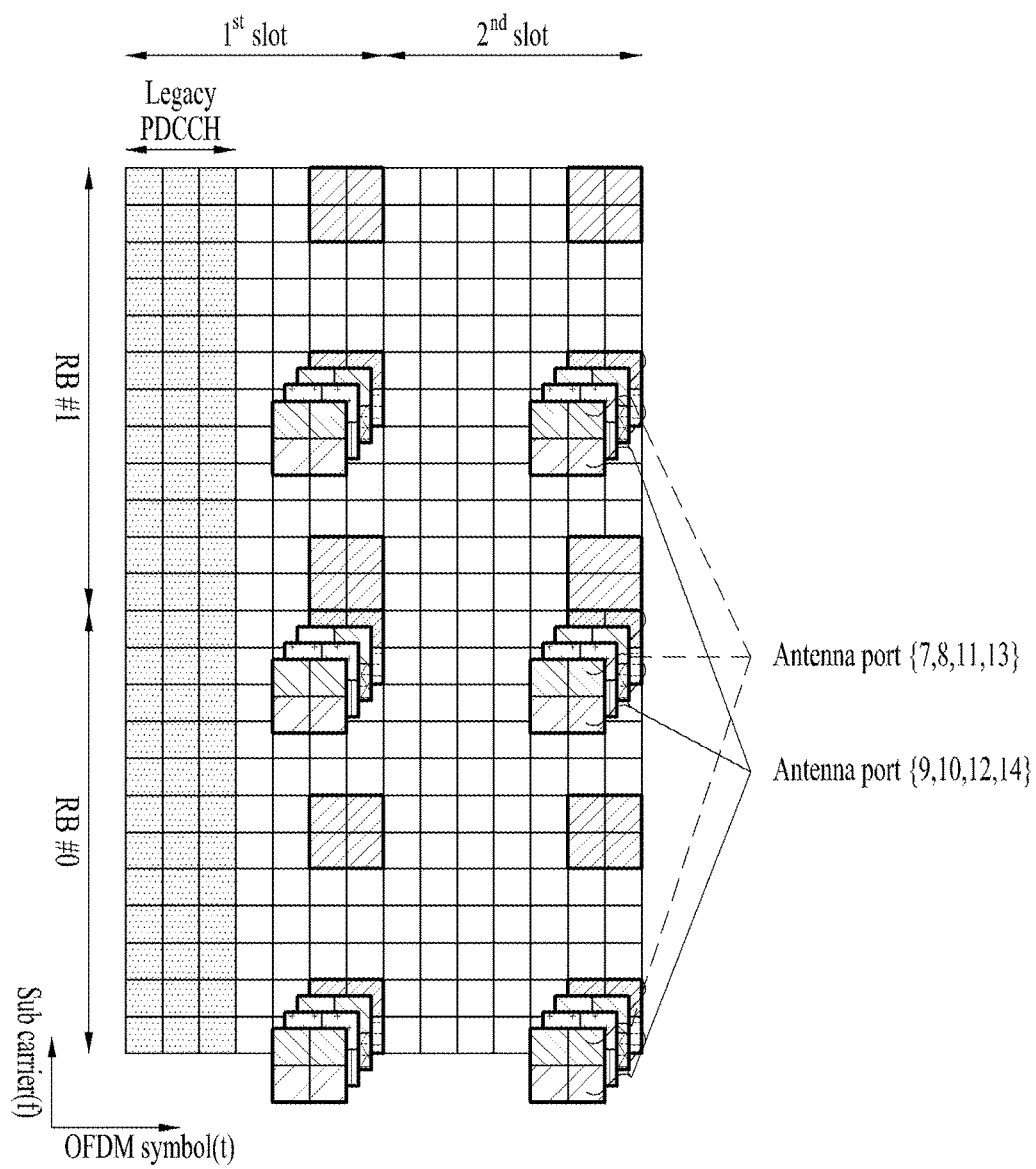
FIG. 15 is a diagram illustrating a method for transmitting and receiving a discovery signal according to one embodiment of the present invention.

FIG. 14 illustrates a DMRS antenna port #7 in a RB bundling based DMRS allocation scheme. Since the DMRS is transmitted per antenna port, if the DMRS is allocated to all DMRS ports #7 to #14 for allocation of 8 layers, the DMRS ports #7 to #14 are multiplexed in a CDM mode as shown in FIG. 15. For convenience, the DMRS ports #7 to #14 are referred to as an antenna port group 1.

Figure 16:
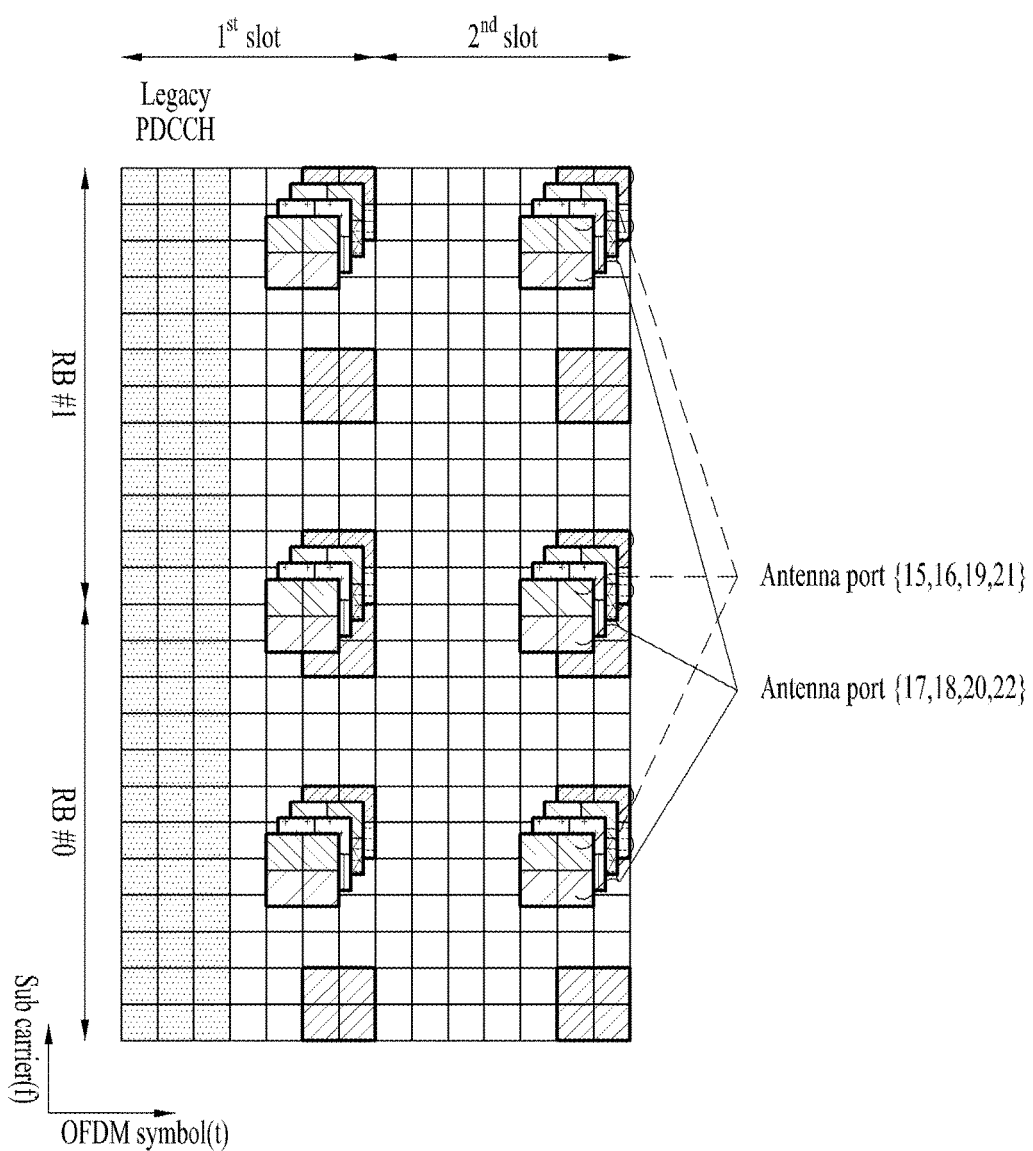
FIG. 16 is a diagram illustrating a method for transmitting and receiving a discovery signal according to another embodiment of the present invention.
Figure 17:
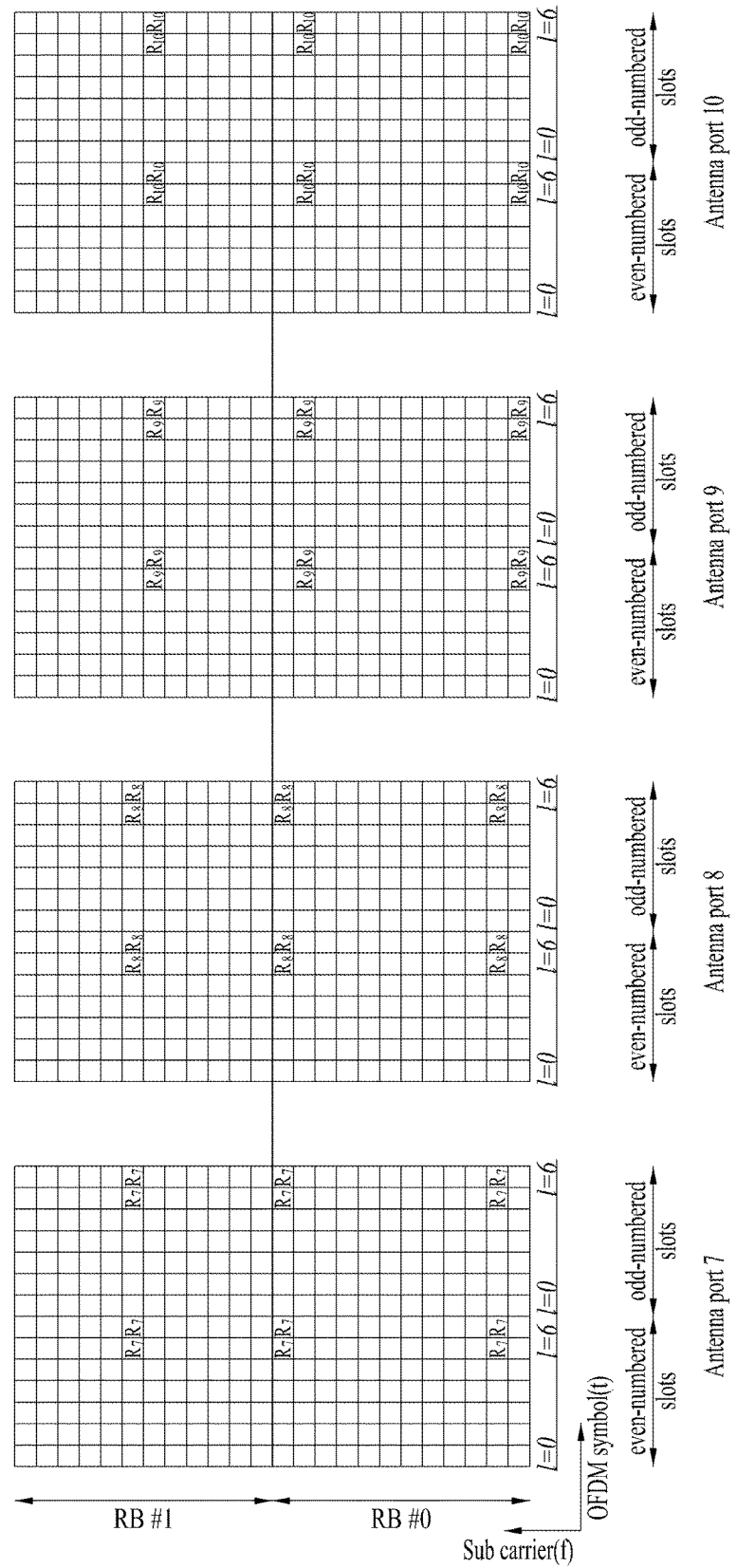
FIGs. 17 to 20 illustrate DMRS mapping patterns per antenna port according to one embodiment of the present iincntion
Figure 18:
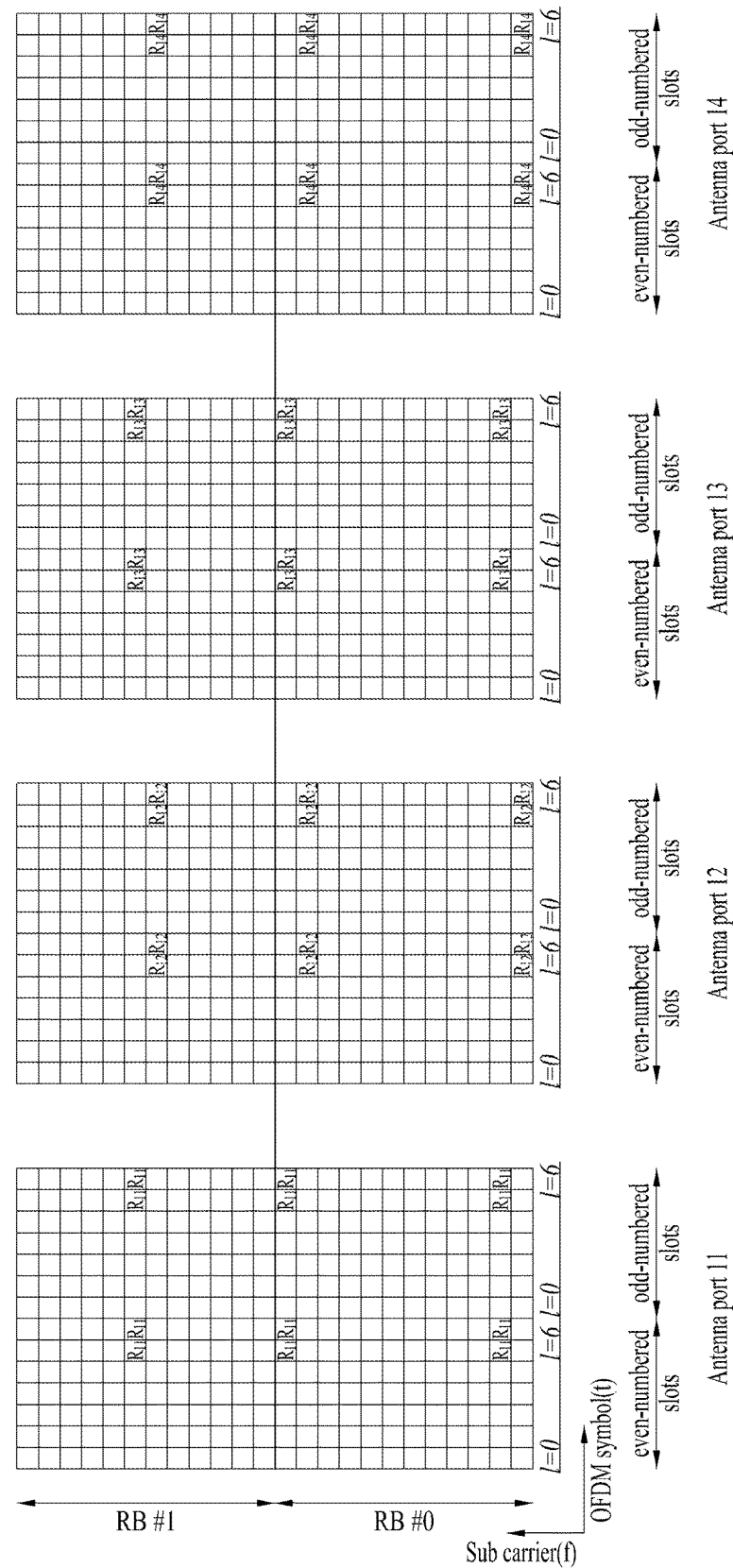
Figure 19:
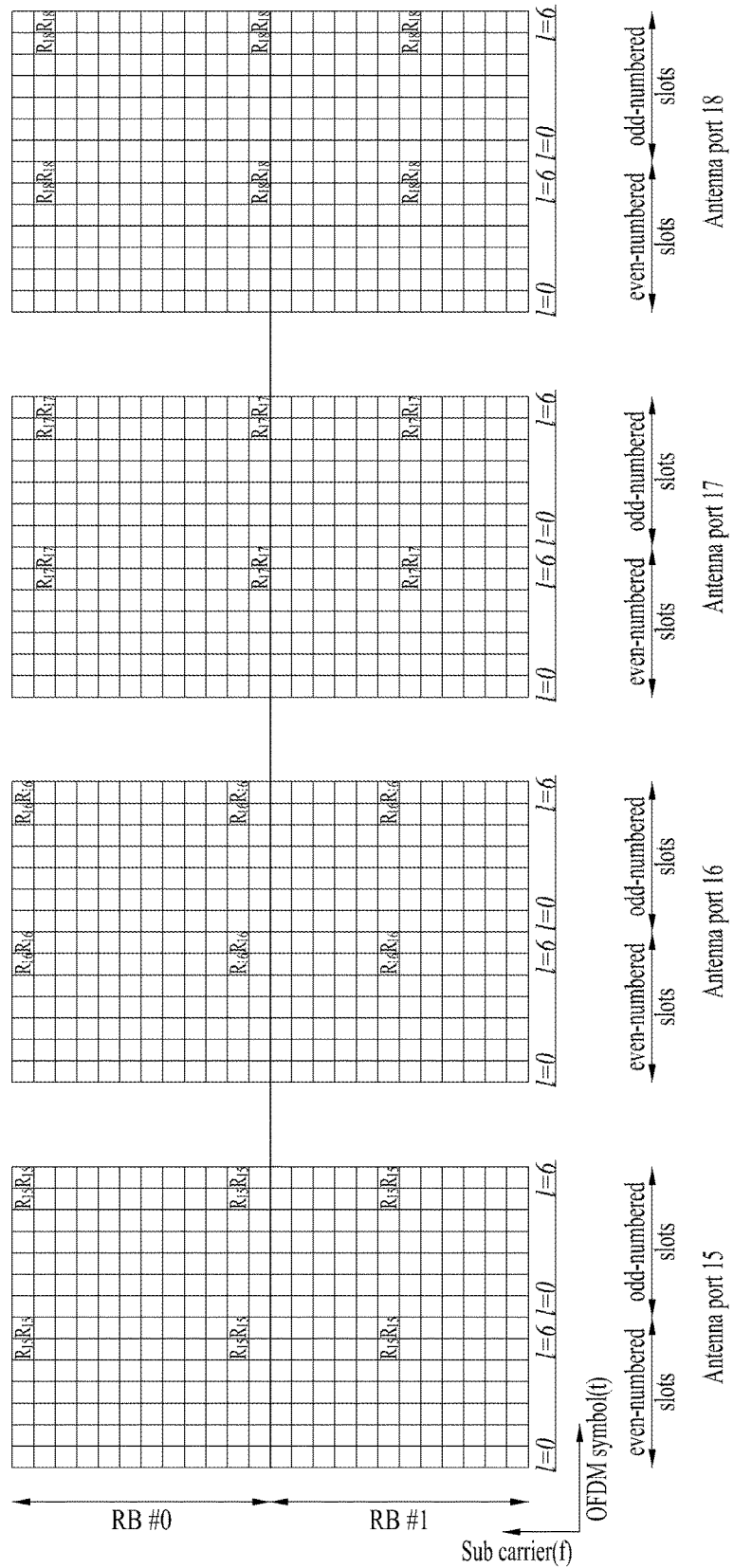
Figure 20:
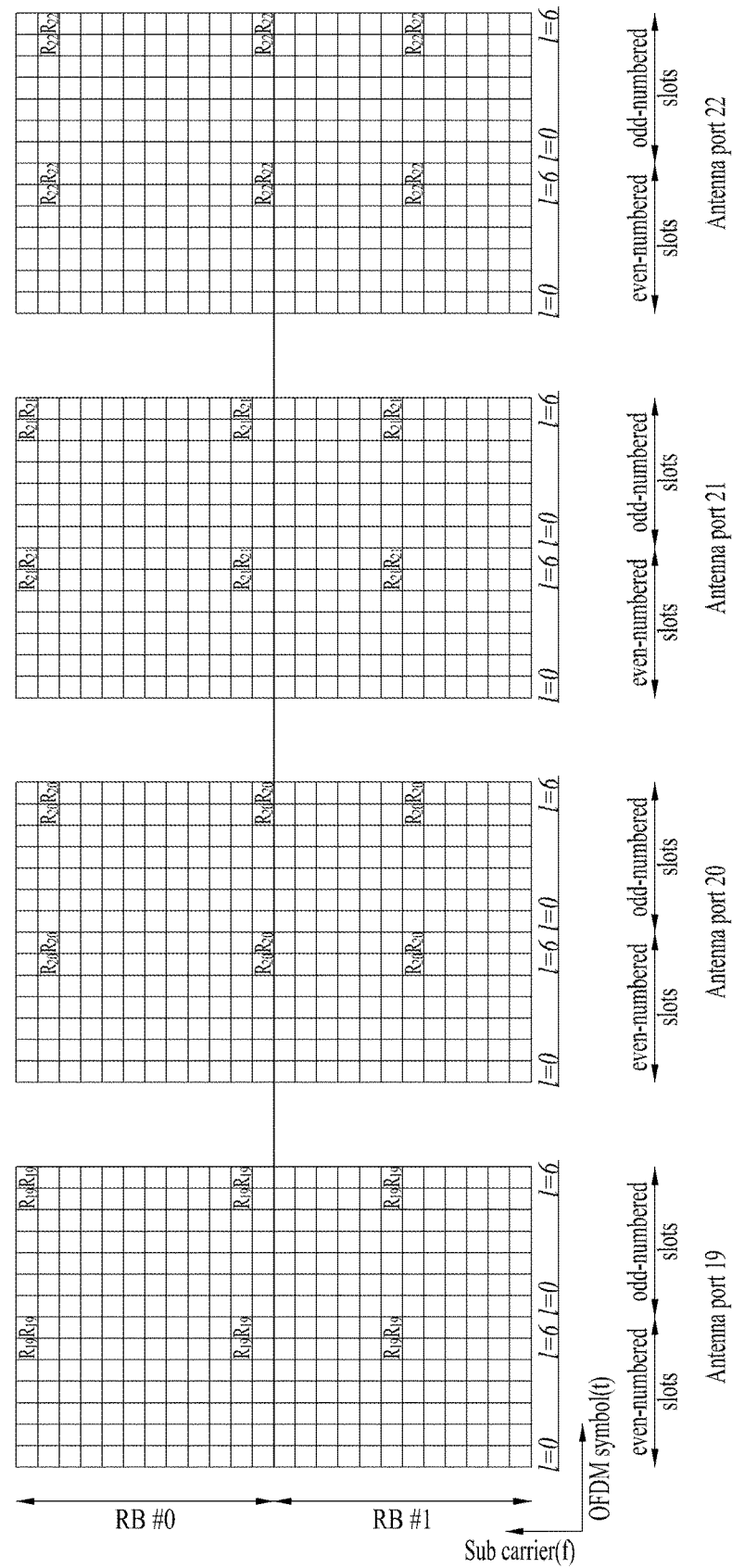

Although the DMRS is transmitted for transmission of 8 layers or less, the DMRS ports #7 to #14 are not allocated for transmission more than 8 layers, whereby additional DMRS ports for transmission of added 8 layers are allocated to empty resource elements (slash lines). For example, if antenna ports for allocation of additional 8 layers are defined as DMRS ports #15 to #22, the DMRS ports #15 to #22 are allocated as shown in FIG. 16. For convenience, the DMRS ports #15 to #22 are referred to as an antenna port group 2.

FIGS. 17 to 20 illustrate DMRS mapping patterns per antenna port according to one embodiment of the present invention. Although the DMRS is mapped in accordance with the pattern shown in FIG. 8 in case of transmission of 8 layers or less, the DMRS is mapped in accordance with the patterns shown in FIGS. 17 to 20 in case of transmission more than 8 layers. Although a basic unit of the DMRS mapping pattern is 1 RB in case of transmission of 8 layers or less, the basic unit of the DMRS mapping pattern is changed to bundled RBs and density of DMRS RE is reduced to ½ in case of transmission more than 8 layers.

Multiplexing of DMRS

Meanwhile, since the DMRS RE of the antenna port group 1 and the DMRS RE of the antenna port group 2 are not overlapped with each other, even though the antenna port group 1 and the antenna port group 2 transmit the DMRS at the same time, collision between the DMRS REs does not occur. However, since there are antenna ports having the same DMRS RE position in each antenna port group, it is required to multiplex the DMRS to avoid collision of the DMRS REs within each group. For example, in the antenna port group 1, antenna ports #7, #8, #11 and #13 have the same DMRS RE position, and antenna ports #9, #10, #12 and #14 have the same DMRS RE position. In the antenna port group 2, antenna ports #15, #16, #19 and #22 have the same DMRS RE position, and antenna ports #17, #18, #20 and #22 have the same DMRS RE position.

According to one embodiment of the present invention, orthogonal codes used for multiplexing of the legacy 8 layers may be reused for multiplexing of 8 layers added based on RB bundling. Since the additionally allocated antenna port group 2 is independent from the DMRS RE of the antenna port group 1, even though orthogonal codes used for the antenna port group 1 are reused for the antenna port group 2, collision between the antenna port group 1 and the antenna port group 2 does not occur. For example, if the additionally allocated DMRS ports are #15 to #22 as listed in Table 4, orthogonal spreading codes of the legacy DMRS ports #7 to #14 may be applied to the DMRS ports #15 to #22 as they are.

TABLE 4

| Antenna port p | $[\bar{w}_p(0) \; \bar{w}_p(1) \; \bar{w}_p(2) \; \bar{w}_p(3)]$ |
|---|---|
| 7, 15 | [+1 +1 +1 +1] |
| 8, 16 | [+1 −1 +1 −1] |
| 9, 17 | [+1 +1 +1 +1] |
| 10, 18 | [+1 −1 +1 −1] |
| 11, 19 | [+1 +1 −1 −1] |
| 12, 20 | [−1 −1 +1 +1] |
| 13, 21 | [+1 −1 −1 +1] |
| 14, 22 | [−1 +1 +1 −1] |

Allocation of Layers

In case of transmission of 8 layers or less, the layers have been sequentially allocated to antenna ports in accordance with indexes of the antenna ports. For example, layer #n has been allocated to antenna port #n.

If this method is applied to transmission of 9 layers or more, 8 layers are first allocated to the antenna port group 1 (antennas #7 to #14) and then the other layers are allocated to the antenna port group 2 (antennas #15 to #22). RSs of the 8 layers allocated to the antenna port group 1 are first multiplexed by CDM mode.

Figure 21:
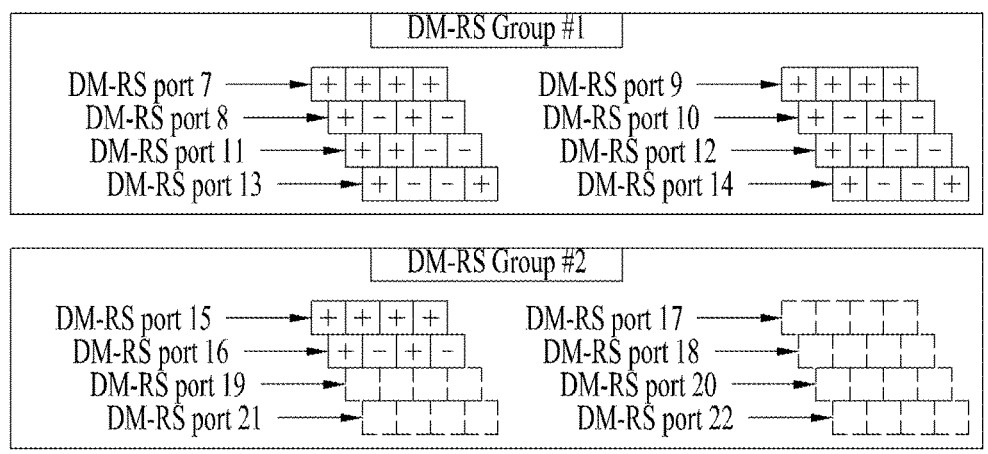
FIG. 21 illustrates the result of sequential layer allocation when the number of layers of a radio channel is 10.

FIG. 21 illustrates the result of sequential layer allocation when the number of layers of a radio channel is 10. As shown in FIG. 21, 8 DMRSs are multiplexed within the same DMRS pattern in case of layers No. 1 to No. 8, whereby maximum mutual interference occurs between the DMRSs. In case of the other two layers, two DMRSs are only multiplexed within the same DMRS pattern, whereby relatively less mutual interference occurs. In other words, high mutual interference occurs between the DMRSs in the antenna port group 1, whereas low mutual interference occurs between the DMRSs in the antenna port group 2.

Although the sequential layer allocation may be reused for transmission of 16 layers, imbalance in channel estimation performance per antenna port group may be caused, whereby the fundamental performance difference in demodulation of multiple streams may be caused.

According to one embodiment of the present invention, if total rank or layers exceed 8, the layer allocation is changed as follows. First of all, the sequential layer allocation is applied within the same antenna port group. However, the layers are allocated alternately among the entire antenna port groups. Table 5 illustrates a rule that layers are allocated alternately for antenna port groups.

TABLE 5

| DM-RS Group | Final layer allocation order | DMRS port allocation order | Final Layer→DMRS port allocation rule |
|---|---|---|---|
| Group #1 | {1, 3, 5, 7, 9, 11, 13, 15} | {7, 8, 9, 10, 11, 12, 13, 14} | Layer 1 → DMRS port #7<br>Layer 3 → DMRS port #8<br>Layer 5 → DMRS port #9<br>Layer 7 → DMRS port #10<br>Layer 9 → DMRS port #11<br>Layer 11 → DMRS port #12<br>Layer 13 → DMRS port #13<br>Layer 15 → DMRS port #14 |
| Group #2 | {2, 4, 6, 8, 10, 12, 14, 16} | {15, 16, 17, 18, 19, 20, 21, 22} | Layer 2 → DMRS port #15<br>Layer 4 → DMRS port #16<br>Layer 6 → DMRS port #17<br>Layer 8 → DMRS port #18<br>Layer 10 → DMRS port #19<br>Layer 12 → DMRS port #20<br>Layer 14 → DMRS port #21<br>Layer 16 → DMRS port #22 |

Figure 22:
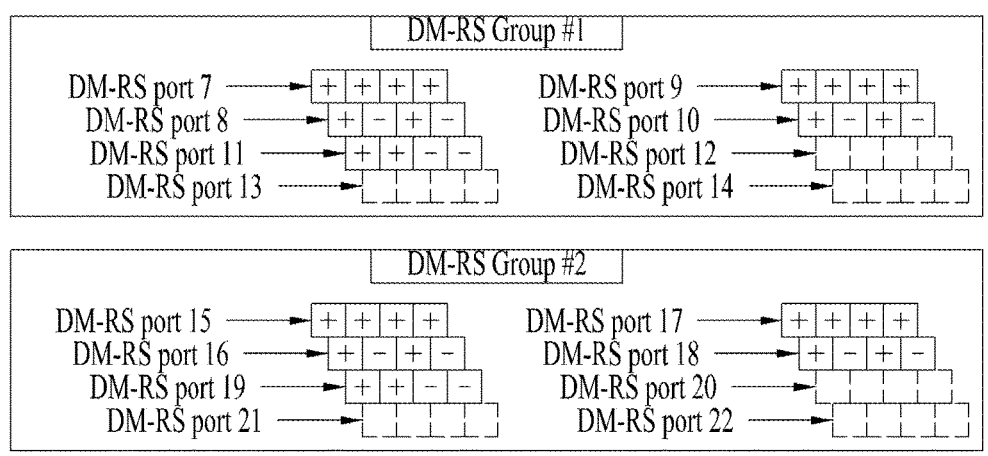
FIG. 22 illustrates the result of layer allocation according to one embodiment of the present invention.

FIG. 22 illustrates the result of layer allocation according to one embodiment of the present invention. As a result of layer allocation according to the present invention, the number of layers allocated per antenna port group is maintained equally or has a difference in one, whereby the substantially same channel estimation quality is acquired between the antenna ports.

Generation of DMRS Sequence

A length of the DMRS sequence may be determined considering RB bundling based DMRS mapping scheme and DMRS density. In other words, the length of the DMRS sequence in case of 8 layers or less and the length of the DMRS in case of 9 layers or more may be configured and generated differently from each other.

First of all, in case of 8 layers or less, the length of the sequence is determined considering 3 REs per RB and 4 REs per TTI density. In case of 9 layers or more, there is no change in 4 REs per TTI, but 3 REs per RB are changed to 3 REs per 2 RBs. In other words, considering 2 RB bundling, frequency domain density of the DMRS is changed from 3 REs per PRB to 3 REs per 2 PRBs.

In case of 8 layers or less, a sequence generation function of the DMRS is expressed as follows.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

[Equation 8]

In the Equation 8, $N_{RB}^{max,DL}$ is a maximum value of downlink bandwidth configuration, and a function c(i) is a Pseudo-random sequence generation function.

The DMRS sequence generation equation is commonly used for DMRS ports #{7, 8, ..., 14} in the current LTE-A system. According to the Equation 8, the eNB first generates an entire DMRS sequence length allocated to 4 OFDM symbols. Since one RB needs a total of 12 sequence elements per port, the entire sequence length becomes $12N_{RB}^{max,DL}$.

The generated DMRS sequence is mapped into resource elements in accordance with Equation 9.

$$a_{k,l}^{(p)} = w_p(l') \cdot r(3 \cdot l' \cdot N_{RB}^{max,DL} + 3 \cdot \eta_{PRB} + m')$$

$$w_p(j) = \begin{cases} \overline{w}_p(j) & (m' + n_{PRB})\bmod 2 = 0 \\ \overline{w}_p(3-j) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$l = $ $$\begin{cases} l'\bmod 2 + 2 & \text{if in a special subframe with configuration 3, 4, or 8} \\ l'\bmod 2 + 2 + 3\lfloor l'/2 \rfloor & \text{if in a special subframe with configuration 1, 2, 6, or 7} \\ l'\bmod 2 + 5 & \text{if not in a special subframe} \end{cases}$$

$$l' = \begin{cases} 0, 1, 2, 3 & \text{if } n_s\bmod 2 = 0 \text{ and in a special subframe with configuration 1, 2, 6, or 7} \\ 0, 1 & \text{if } n_s\bmod 2 = 0 \text{ and not in a special subframe with configuration 1, 2, 6, or 7} \\ 2, 3 & \text{if } n_s\bmod 2 = 1 \text{ and not in a special subframe with configuration 1, 2, 6, or 7} \end{cases}$$

$m' = 0, 1, 2$

[Equation 9]

In the Equation 9, k means an index of a subcarrier within the PRB, l means an index of an OFDMA symbol within the PRB, p means an index of a DMRS port, and $n_{PRB}$ means an index of an allocated PRB.

In the Equation 9, the DMRS sequence length, that is, an index range of the sequence is determined by $3 \cdot 1' \cdot N_{RB}^{max,DL} + n_{PRB} + m'$. That is, it is noted that a maximum value of the index $3 \cdot 1' \cdot N_{RB}^{max,DL} + n_{PRB} + m'$ is $12N_{RB}^{max,DL} - 1$.

However, the Equation 9 cannot be used for DMRS sequence mapping for supporting 9 to 16 layers. This is because that the length and index range of the DMRS sequence are reduced to ½ if the number of layers exceeds 8.

Therefore, in case of 9 to 16 layers, a DMRS sequence mapping method is suggested as expressed by the following Equation 10 in accordance with one embodiment of the present invention. The following description will be made based on an FDD case but the scope of the present invention is not limited to the FDD case.

$$a_{k,l}^{(p)} = w_p(l') \cdot r(3 \cdot l' \cdot N_{RB}^{max,DL} + 3 \cdot (\eta_{PRB} + k_3) + m')$$

[Equation 10]

where $m' = 0, 1, 2$ $$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$l' = l'\bmod 2 + 5$ $$l' = \begin{cases} 0, 1 & \text{if } n_s\bmod 2 = 0 \\ 2, 3 & \text{if } n_s\bmod 2 = 0 \end{cases}$$

$k = k_1 + k_2 + N_{sc}^{RB}(n_{PRB} + k_3)$ $$k_2 = \begin{cases} 1 & \text{if } p = 7, 8, 11, 13, 15, 16, 19, 21 \\ 0 & \text{if } p = 9, 10, 12, 14, 17, 18, 20, 22 \end{cases}$$

if $p = 7 \sim 14$ $k_1 = 0, k_3 = 0$ if $m' = 0$ $k_1 = 10, k_3 = 0$ if $m' = 1$ $k_1 = 5, k_3 = 1$ if $m' = 2$ elseif $p = 15 \sim 22$ $k_1 = 5, k_3 = 0$ if $m' = 0$ $k_1 = 0, k_3 = 1$ if $m' = 1$ $k_1 = 10, k_3 = 1$ if $m' = 2$ endif The mapping result of the DMRS sequence according to the Equation 10 is as described with reference to FIGS. 17 to 20.

Meanwhile, since the length of the DMRS sequence is reduced to ½ in transmission of 9 to 16 layers, a change of the method for generating DMRS sequence is required.

According to one embodiment of the present invention, the sequence length is determined considering reduced DMRS RE density in transmission of 9 layers or more. For example, the entire length of the DMRS sequence r(m) is set to $12N_{RB}^{max,DL}/2$ not $12N_{RB}^{max,DL}$. The eNB reduces the length of the DMRS sequence r(m) to ½ as DMRS RE density per port is reduced to ½.

According to another embodiment of the present invention, the legacy DMRS sequence length is used even in case of transmission of 9 layers or more. However, in this case, the DMRS sequence length is changed by puncturing during DMRS mapping. For example, the eNB sets the length of the DMRS sequence r(m) to $12N_{RB}^{max,DL}$ equally to the related art. If DMRS RE density per port is reduced to ½, the eNB punctures the DMRS sequence r(m) at a length corresponding to the reduced DMRS RE density and then maps the punctured DMRS sequence into DMRS RE.

Figure 23:
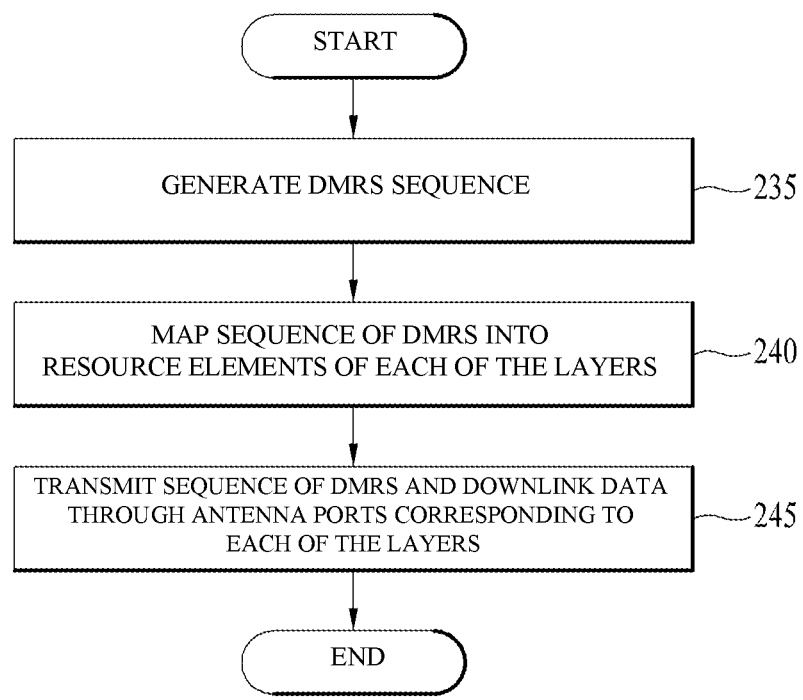
FIG 23 illustrates a method for transmuting DMRS according to one embodiment of the present invention.

FIG. 23 illustrates a method for transmitting DMRS according to one embodiment of the present invention. Repeated description of the above-described method will be omitted.

Referring to FIG. 23, the eNB generates a sequence of a DMRS (235). For example, the eNB generates the sequence of the DMRS at a length of $12N_{RB}^{max,DL}$ if the number of layers is 8 or less, and generates the sequence of the DMRS at a length of $12N_{RB}^{max,DL}/2$ if the number of layers exceeds 8. $N_{RB}^{max,DL}$ means a maximum value of a downlink bandwidth configuration. According to another embodiment, the eNB may perform puncturing for the length of the sequence of the DMRS at ½ if the numbers of layers exceeds 8.

The eNB maps the sequence of the DMRS into resource elements of the each of the layers (240). If the number of layers exceeds 8, the sequence of the DMRS is mapped into the resource elements in accordance with a pattern on at least two bundled consecutive resource blocks The pattern on the two bundled resource blocks may be a pattern that reduces density of resource elements, into which the sequence of the DMRS is mapped, to ½ in a frequency domain.

The eNB transmits the sequence of the DMRS mapped into the resource elements and downlink data (i.e., PDSCH) through the each of antenna ports corresponding to the each of the layers (245).

If the number of layers is 8 or less, the layers are sequentially allocated to the antenna ports in accordance with indexes of the antenna ports.

On the other hand, if the number of layers exceeds 8, the layers are alternately allocated to at least two groups of the antenna ports. The antenna ports of the second one of the groups of the antenna ports are used for transmission of the DMRS only if the number of layers exceeds 8. First resource elements and second resource elements may be mutually exclusive, wherein the DMRS sequence transmitted through the antenna ports of the first group of the groups of the antenna ports is mapped into the first resource elements, and the DMRS sequence transmitted through the antenna ports of the second group of the groups of the antenna ports is mapped into the second resource elements.

The eNB applies orthogonal codes corresponding to the each of antenna ports to the sequence of the DMRS. If the number of layers exceeds 8, the orthogonal codes are reused per each of the groups of the antenna ports.

The UE decodes a PDSCH (physical downlink shared channel) on the basis of the sequence of the received DMRS.

Figure 24:
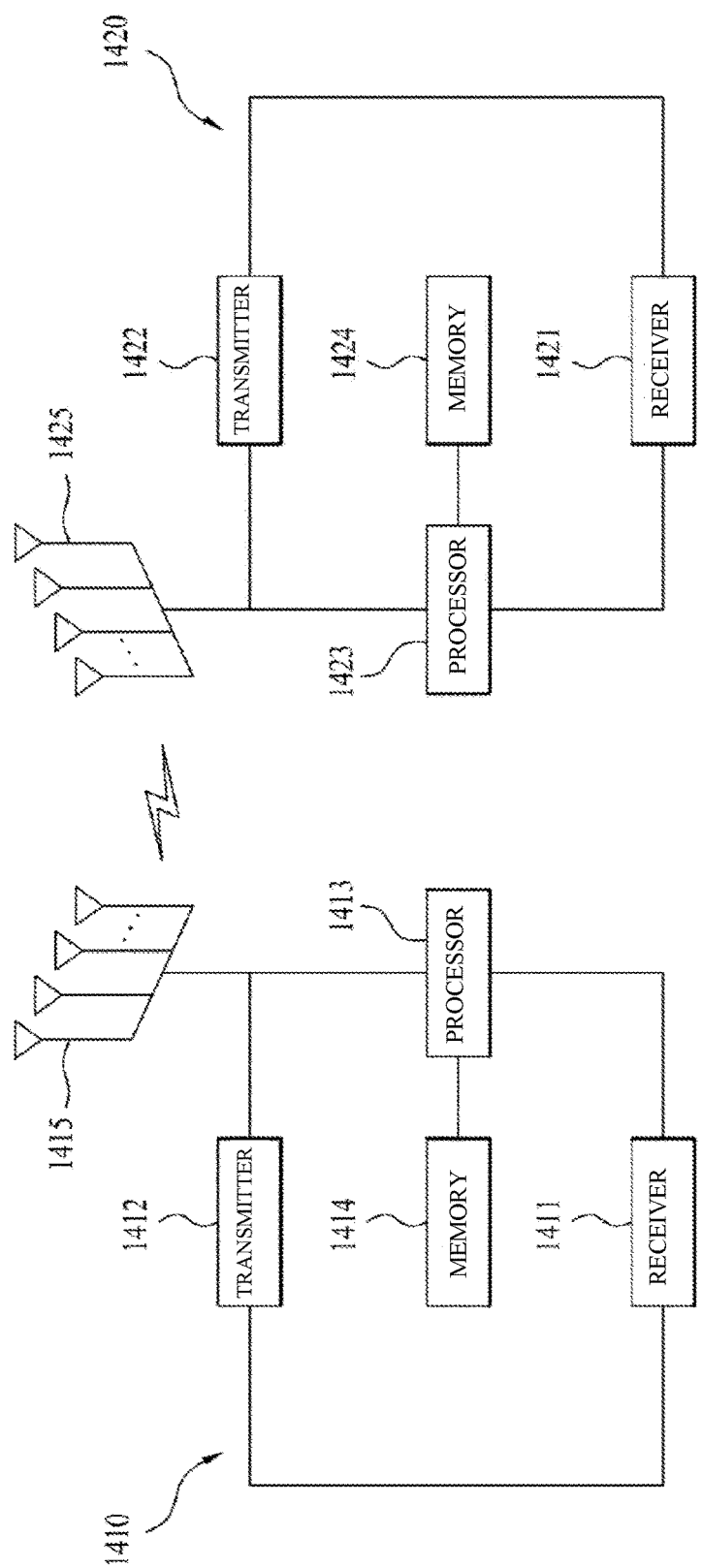
FIG 24 illustrates a UE and an eNB according lo one embodiment of the present invention.

FIG. 24 illustrates a UE and an eNB according to one embodiment of the present invention. The UE and the eNB of FIG. 24 may perform the operations of the UE and the eNB according to the aforementioned embodiments.

The eNB 1410 may include a receiver 1411, a transmitter 1412, a processor 1413, a memory 1414 and a plurality of antennas 1415. The plurality of antennas 1415 mean the eNB that supports MIMO transmission and reception. The receiver 1411 may receive a variety of signals, data and information on an uplink from the UE. The transmitter 1412 may transmit a variety of signals, data and information on a downlink to the UE. The processor 1413 may control the overall operation of the eNB 1410.

The processor 1413 of the eNB 1410 may process information received by the eNB 1410 and information to be transmitted to an external device, and the memory 1414 may store the processed information for a predetermined time and may be replaced by a component such as a buffer (not shown).

According to one embodiment of the present invention, the processor 1413 of the eNB generates a sequence of a DMRS, and maps the sequence of the DMRS into resource elements of each of the layers. The transmitter 1412 transmits the sequence of the DMRS mapped into the resource elements through each of antenna ports corresponding to the each of the layers. The processor 1413 maps the sequence of the DMRS into the resource elements in accordance with a pattern on at least two bundled consecutive resource blocks if the number of layers exceeds a predetermined number.

The UE 1420 may include a receiver 1421, a transmitter 1422, a processor 1423, a memory 1424 and a plurality of antennas 1425. The plurality of antennas 1425 mean the UE that supports MIMO transmission and reception. The receiver 1421 may receive a variety of signals, data and information on a downlink from the eNB. The transmitter 1422 may transmit a variety of signals, data and information on an uplink to the eNB. The processor 1423 may control the overall operation of the UE 1420.

The processor 1423 of the UE 1420 may process information received by the eNB 1410 and information to be transmitted to an external device, and the memory 1424 may store the processed information for a predetermined time and may be replaced by a component such as a buffer (not shown).

The details of the aforementioned eNB and the aforementioned UE may be configured in such a manner that the aforementioned various embodiments of the present invention may independently be applied to the eNB and the UE, or two or more embodiments may simultaneously be applied to the eNB and the UE, and repeated description will be omitted for clarification.

Also, in the description of FIG. 24, the description of the eNB 1410 may also be equally applied to a relay device functioning as a downlink transmitter or an uplink receiver. The description of the UE 1420 may also be equally applied to a relay device functioning as a downlink receiver or an uplink transmitter.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Although the aforementioned method for transmitting and receiving a discovery signal in a wireless communication system and the apparatus therefor have been described based on the 3GPP LTE system, the method and apparatus may be applied to various wireless communication systems in addition to the 3GPP LTE system.

The invention claimed is:

1. A method for transmitting, by a base station, a demodulation reference signal (DMRS) in a wireless communication system, the method comprising:
generating a sequence of the DMRS;
mapping the sequence of the DMRS into resource elements of each of layers; and
transmitting the sequence of the DMRS mapped into the resource elements through antenna ports related to the layers,
wherein when a number of the layers exceeds a predetermined number, the sequence of the DMRS is mapped into the resource elements based on a pattern on at least two bundled consecutive resource blocks, and the layers are allocated to antenna port groups alternately, and
wherein when the number of the layers does not exceed the predetermined number, the layers are allocated to the antenna ports sequentially based on antenna port indexes.

2. The method according to claim 1, wherein the generating the sequence of the DMRS comprises:
puncturing the sequence of the DMRS at a length of ½ if the number of the layers exceeds the predetermined number.

3. The method according to claim 1, wherein one of the antenna port groups is used for transmission of the DMRS only if the number of the layers exceeds the predetermined number.

4. The method according to claim 3,
wherein first resource elements and second resource elements are mutually exclusive, and
wherein the DMRS sequence transmitted through a first group of antenna ports among the antenna port groups is mapped into the first resource elements, and the DMRS sequence transmitted through a second group of antenna ports among the antenna port groups is mapped into the second resource elements.

5. The method according to claim 3, wherein the mapping the sequence of the DMRS comprises:
applying orthogonal codes for the each of the antenna ports to the sequence of the DMRS, the orthogonal codes being reused per each of the antenna port groups if the number of the layers exceeds the predetermined number.

6. A method for receiving, by a user equipment (UE), a demodulation reference signal (DMRS) in a wireless communication system, the method comprising:
receiving a sequence of the DMRS mapped into resource elements of each of layers through antenna ports related to the layers; and
decoding a physical downlink shared channel (PDSCH) based on the sequence of the DMRS,
wherein when a number of the layers exceeds a predetermined number, the sequence of the DMRS is mapped into the resource elements based on a pattern on at least two bundled consecutive resource blocks, and the layers are allocated to antenna port groups alternately, and
wherein when the number of the layers does not exceed the predetermined number, the layers are allocated to the antenna ports sequentially based on antenna port indexes.

7. The method according to claim 6,
wherein first resource elements and second resource elements are mutually exclusive,
wherein the DMRS sequence transmitted through a first group of antenna ports among the antenna port groups is mapped into the first resource elements, and the DMRS sequence transmitted through a second group of antenna ports among the antenna port groups is mapped into the second resource elements.

8. The method according to claim 6, wherein orthogonal codes corresponding to each of the antenna ports are applied to the sequence of the DMRS, the orthogonal codes being reused per each of the antenna port groups if the number of the layers exceeds the predetermined number.

9. A base station for transmitting a demodulation reference signal (DMRS) in a wireless communication system, the base station comprising:
a processor configured to generate a sequence of the DMRS and mapping the sequence of the DMRS into resource elements of each of layers; and
a transmitter configured to transmit the sequence of the DMRS mapped into the resource elements through antenna ports related to the layers,
wherein when a number of the layers exceeds a predetermined number, the processor maps the sequence of the DMRS into the resource elements based on a pattern on at least two bundled consecutive resource blocks and the layers are allocated to antenna port groups alternately, and
wherein when the number of the layers does not exceed the predetermined number, the layers are allocated to the antenna ports sequentially based on antenna port indexes.

* * * * *